United States Patent
Won et al.

(10) Patent No.: US 10,993,077 B2
(45) Date of Patent: Apr. 27, 2021

(54) METHOD OF DETERMINING PRESENT LOCATION AND PROVIDING WALKING ROUTE INFORMATION

(71) Applicants: NAVER CORPORATION, Seongnam-si (KR); NAVER LABS CORPORATION, Seongnam-si (KR)

(72) Inventors: Ji Hye Won, Seongnam-si (KR); Young Hyun Ju, Seongnam-si (KR); Hyun Gu Roh, Seongnam-si (KR)

(73) Assignees: NAVER CORPORATION, Seongnam-si (KR); NAVER LABS CORPORATION, Seongnam-si (KR)

( * ) Notice: Subject to any disclaimer, the term of this patent is extended or adjusted under 35 U.S.C. 154(b) by 0 days.

(21) Appl. No.: 16/789,011

(22) Filed: Feb. 12, 2020

(65) Prior Publication Data

US 2020/0260221 A1 Aug. 13, 2020

(30) Foreign Application Priority Data

Feb. 13, 2019 (KR) .................... 10-2019-0016833

(51) Int. Cl.
  *G10L 15/22* (2006.01)
  *H04W 4/024* (2018.01)
  *G06F 16/29* (2019.01)

(52) U.S. Cl.
  CPC ............ *H04W 4/024* (2018.02); *G06F 16/29* (2019.01); *G10L 15/22* (2013.01)

(58) Field of Classification Search
  CPC ..... H04W 4/029; H04W 4/025; H04W 64/00; H04W 64/003; H04W 64/006;
  (Continued)

(56) References Cited

U.S. PATENT DOCUMENTS

2003/0063714 A1* 4/2003 Stumer ............... H04L 65/1069
  379/37
2010/0235091 A1 9/2010 Das et al.
  (Continued)

FOREIGN PATENT DOCUMENTS

WO 2009014326 A1 1/2009

OTHER PUBLICATIONS

Office action issued in corresponding Korean patent application No. 10-2019-0016833, dated Dec. 4, 2019.

*Primary Examiner* — Fred A Casca
(74) *Attorney, Agent, or Firm* — Greer Burns & Crain Ltd.

(57) ABSTRACT

A method of identifying a current location, performed by a server having wireless communication with a terminal, includes receiving from the terminal, surrounding environment information input in natural language by a user; performing natural language processing on the surrounding environment information to extract place information about a reference place input by the user and positional relationship information about a positional relationship between the reference place and the user; searching a map database for the reference place corresponding to the place information; estimating a candidate region in which the user is likely to be located, based on the searched-for reference place and the positional relationship information; and determining the candidate region as the user's current location. Because the current location is identified based on the surrounding environment information input by the user, the user's current location can be identified more accurately.

17 Claims, 12 Drawing Sheets

(58) Field of Classification Search
CPC . H04W 12/00503; H04W 4/18; H04W 4/024; H04W 4/021; H04W 4/023; H04B 17/27; H04B 7/086; G06F 16/29; G06F 16/9537; G06F 16/90332; G06F 40/295; G06F 40/35; G06F 40/268; G10L 15/22; G10L 2015/226; G10L 15/1822; G01C 21/3608; G01C 21/362

See application file for complete search history.

(56) References Cited

U.S. PATENT DOCUMENTS

2014/0122031 A1* 5/2014 Lee .................... G01C 21/206
　　　　　　　　　　　　　　　　　　　　　　703/1
2018/0330154 A1* 11/2018 Park ................... G06K 9/209
2019/0289132 A1* 9/2019 Jung .................. H04M 1/725

* cited by examiner

METHOD OF DETERMINING PRESENT LOCATION AND PROVIDING WALKING ROUTE INFORMATION

CROSS-REFERENCE TO RELATED APPLICATION

This application claims priority under 35 U.S.C. § 119 to Korean Patent Application No. 10-2019-0016833 filed on Feb. 13, 2019, in the Korean Intellectual Property Office, the entire contents of which are incorporated herein by reference.

BACKGROUND OF THE INVENTION

1. Field

The present disclosure relates to a method of identifying a current location and a method of providing walking route information. More particularly, the present disclosure relates to a method of identifying a user's current location by using information provided from the user and a method of providing walking route information based on the identified current location.

2. Description of Related Art

This section provides background information related to the present disclosure which is not necessarily prior art.

Recently, a desired destination may be easily visited using a navigation program provided by a terminal. Such navigation programs use electronic equipment, e.g., a Global Navigation Satellite System (GNSS), a Wi-Fi-based positioning system (WPS), or the like, to identify a current location. However, a location identified using a current GNSS has an error of about 10 to 20 meters in an environment with good visibility. Moreover, in areas with many tall buildings, a path of transmission of a satellite signal from the GNSS may be distorted, leading to an error of more than a few tens of meters. In addition, satellite signals cannot be received indoors. Due to such location errors, a route guidance service may provide an inefficient route.

For example, referring to FIG. 1, a user is actually located at a first location SP1 but identification of the location using a GNSS, a WPS, or the like has an error range ER, and thus the user may be erroneously identified as being located at a second location SP2. The radius of the error range ER may actually be several meters to tens of meters. A server providing a route guidance service may detect that the user is located at the second location SP2, and thus may show a second route PT2 to a destination EP passing through a crosswalk. However, the user is actually located at the first location SP1, and thus may arrive at the destination EP via a shorter path when a first route PT1 is used. Because a width of a two-lane road is only about 6 meters, there are many cases in which a user's current location is incorrectly detected and inefficient route guidance is provided as shown in the example of FIG. 1.

Moreover, the user may be unfamiliar with reading maps or using terminals, have no prior information about the geography of a surrounding environment, or have difficulties pinpointing his or her location spatially. In addition, when the user receives route guidance information in the form of speech, the user may move to a crosswalk from the first location SP1 at which the user is actually located and then cross the crosswalk in a direction opposite to the direction toward the destination EP, according to the route guidance information instructing the user to cross the crosswalk. Therefore, the user may be severely confused by the route guidance service.

BRIEF SUMMARY OF THE INVENTION

This section provides a general summary of the inventive concept, and is not a comprehensive disclosure of its full scope or all features of the inventive concept.

A user's current location may be identified using not only information about a current sensing location obtained by electronic equipment such as a GNSS or a WPS but also information previously known to the user or information obtained by the sense of sight.

The present disclosure is directed to more accurately identifying a user's current location by using information provided directly by the user and providing walking route information based on the identified current location.

Additional aspects will be set forth in part in the description which follows and, in part, will be apparent from the description, or may be learned by practice of the presented embodiments.

To address the above aspects, the first aspect of the present disclosure, a method of identifying a current location, performed by a server establishing wireless communication with a terminal, includes receiving, from a terminal, surrounding environment information input in natural language by a user; performing natural language processing on the surrounding environment information to extract place information about a reference place input by the user and positional relationship information about a positional relationship between the reference place and the user; searching a map database for the reference place corresponding to the place information; estimating a candidate region in which the user is likely to be located, based on the searched-for reference place and the positional relationship information; and determining the candidate region as the user's current location.

According to a second aspect of the present disclosure, a method of providing route guidance information, performed by a server establishing wireless communication with a terminal, includes receiving from the terminal a route guidance request including a current sensing location and a destination; transmitting to the terminal an input request for a user to input surrounding environment information when the route guidance request satisfies a predetermined confirmation condition; receiving, from the terminal, surrounding environment information input in natural language by the user in response to the input request; performing natural language processing on the surrounding environment information to extract place information about a reference place input by the user and positional relationship information about a positional relationship between the reference place and the user; searching a map database for the reference place, corresponding to the place information, in a region set with respect to the current sensing location; estimating a candidate region in which the user is likely to be located, based on the reference place and the positional relationship information; determining the candidate region as the user's current location; and generating route guidance information regarding a route from the determined current location to the destination and transmitting the route guidance information to the terminal.

According to a third aspect of the present disclosure, there is provided a computer program stored in a medium to execute the method of identifying a current location or the method of providing walking route information by using a computer.

Other aspects, features, and advantages other than those described above will become apparent from the following drawings, claims, and detailed description of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
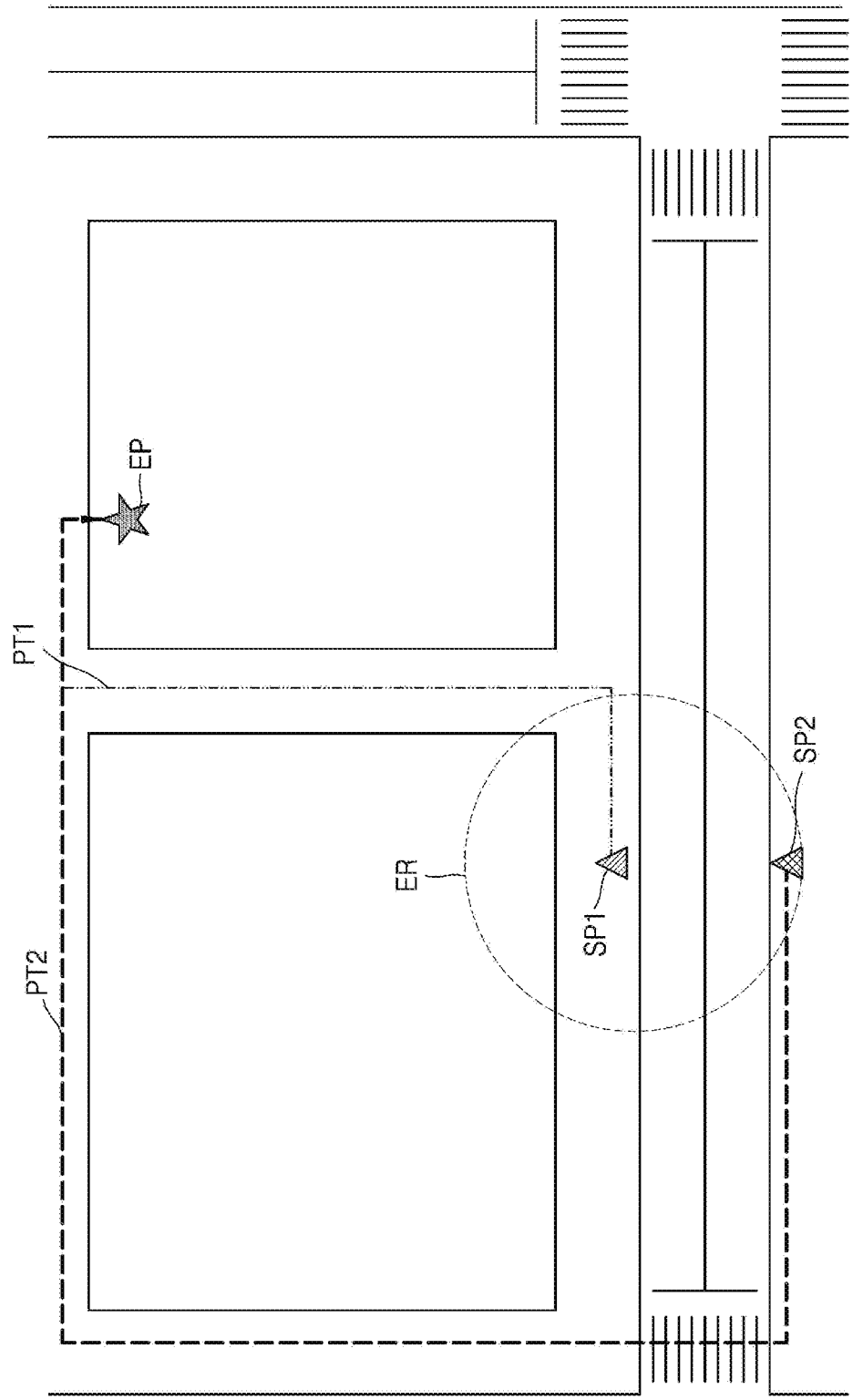
FIG. 1 illustrates an example of a walking route path.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by the example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output (I/O) operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

Figure 2:
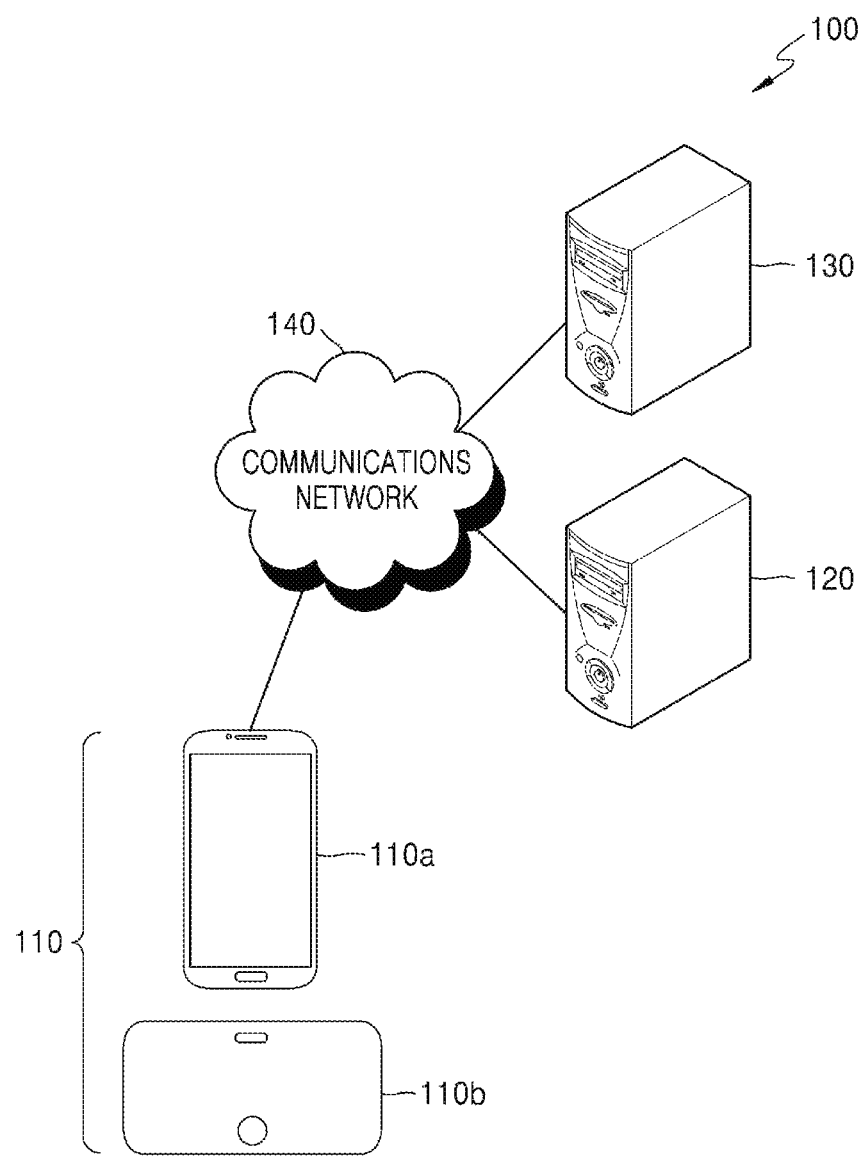
FIG. 2 illustrates a configuration of a route guidance system according to an embodiment.

FIG. 2 illustrates a configuration of a route guidance system according to an embodiment.

Referring to FIG. 2, a route guidance system 100 includes a terminal 110, a first server 120, a second server 130, and a network 140 connecting them to one another.

The route guidance system 100 according to the present embodiment is capable of identifying the current location of a user of the terminal 110, based on surrounding environment information provided by the user, and providing the user with information about a walking route to a destination, based on the identified current location. The surrounding environment information is information input to the terminal 110 by the user and may represent the current location. For example, the surrounding environment information may be generally a description of a user's location written in natural language, for example, "in front of N Store," "in front of the Gangnam Station Bus Stop," "in front of the coffee shop," "in front of Exit 4," "between N convenience store and N bookstore," "N convenience store on the left and N bookstore on the right," "in front of the blue door," "N theater" or the like. The surrounding environment information may be input in text or input verbally in the form of a speech signal. The current location may be understood to include both the current location of the terminal 110 and the current location of the user who is carrying the terminal 110. That is, the current location of the user who is carrying the terminal 110 may be understood to be substantially the same as the current location of the terminal 110.

The terminal 110 may be a portable electronic device that performs a computing function. For example, the terminal 110 may include a first terminal 110a, a second terminal 110b and so on.

FIG. 2 illustrates that the first terminal 110a is a smart phone but the first terminal 110a is not limited thereto. The first terminal 110a may include a wireless communication module, an I/O device, and a location sensing module such as a GNSS module, similar to a smart phone. The second terminal 110b is a portable electronic device for performing a certain function, and may include a wireless communication module and an I/O device but may not include a location sensing module. For example, the second terminal 110b may be a standalone electronic device that provides an interpretation service using wireless communication.

Examples of the terminal 110 may include a laptop computer, a tablet PC, an ultra-book, a slate PC, a cellular phone, personal digital assistant (PDA), a portable multimedia player (PMP), a navigation device, a wearable device, such as a watch-type terminal (e.g., a smart watch), a glasses-type terminal (e.g., smart glasses) and a head mounted display (HMD), and the like.

The terminal 110 may receive a route guidance request, surrounding environment information, etc. from the user, and output route guidance information, an additional information request, and the like. The terminal 110 may communicate with the first server 120 by connecting to the network 140 through wireless communication.

The network 140 may connect the terminal 110, the first server 120, and the second server 130 to communicate with one another. For example, the network 140 provides a connection path through which the terminal 110 may connect to the first server 120 to transmit packet data thereto or receive packet data therefrom. The network 140 may provide a connection path through which the first server 120 may connect to the second server 130 to read data from the second server 130 or to modify or update data stored in the second server 130.

The network 140 may include a wired network and/or a wireless network. Examples of the network 140 may include various networks such as a local area network (LAN), a metropolitan area network (MAN), a wide area network (WAN), and the like. The network 140 may also include the World Wide Web (WWW). However, the network 140 according to the present embodiment is not limited to the networks listed above, and may include at least one of a well-known mobile communication network, a known wireless data network, a well-known telephone network, or a well-known wired/wireless television network. The network 140 may include at least one of network topologies, including bus networks, star networks, ring networks, mesh networks, star-bus networks, tree or hierarchical networks, etc.

The first server 120 may be embodied as a computer device or a plurality of computer devices that communicate with the terminal 110 via the network 140 and provide instructions, code, files, content, services, and the like. The first server 120 may perform a method of identifying a current location and a method of providing route guidance information according to the present disclosure. The first server 120 may provide the user of the terminal 110 with a walking route information service according to the present disclosure.

Similarly, the second server 130 may be embodied as a computer device or a plurality of computer devices that communicate with the first server 120 via the network 140. The second server 130 may store map data, identify a user's current location on a map, and generate route guidance information about a route to a destination input by the user. The second server 130 may provide map services, e.g., Naver map (https://map.naver.com) and Google map (https://map.google.com), and/or navigation services. The terminal 110 may directly connect to the second server 130 and receive a service provided by the second server 130. For easy understanding of the present disclosure, the first server 120 and the second server 130 are illustrated as different devices but may be provided in one computing device.

In the present specification, the second server 130 is described as functioning as a map database that stores data related to a map. The second server 130 may store not only an outdoor map but also an indoor map. The second server 130 may include information about a point of interest (POI) on a map or road view information obtained by photographing roads on the map.

The first server 120 may provide an application installation file to the terminal 110 via the network 140. The terminal 110 may install an application by using the provided application installation file. The terminal 110 may connect to the first server 120 and receive a service or content provided from the first server 120, under control of an operating system (OS) installed in the terminal 110 and at least one program (for example, a browser or an installed application). For example, the terminal 110 may provide the surrounding environment information to the first server 120 under control of an application, and the first server 120 may identify the user's current location, based on the surrounding environment information. The first server 120 may generate route guidance information, based on the user's current location identified based on the surrounding environment information, and provide the route guidance information to the terminal 110.

For easy understanding of the present disclosure, the second server 130 will be hereinafter referred to as a map server 130 and the first server 120 will be hereinafter referred to as a main server (or server) 120.

Figure 3:
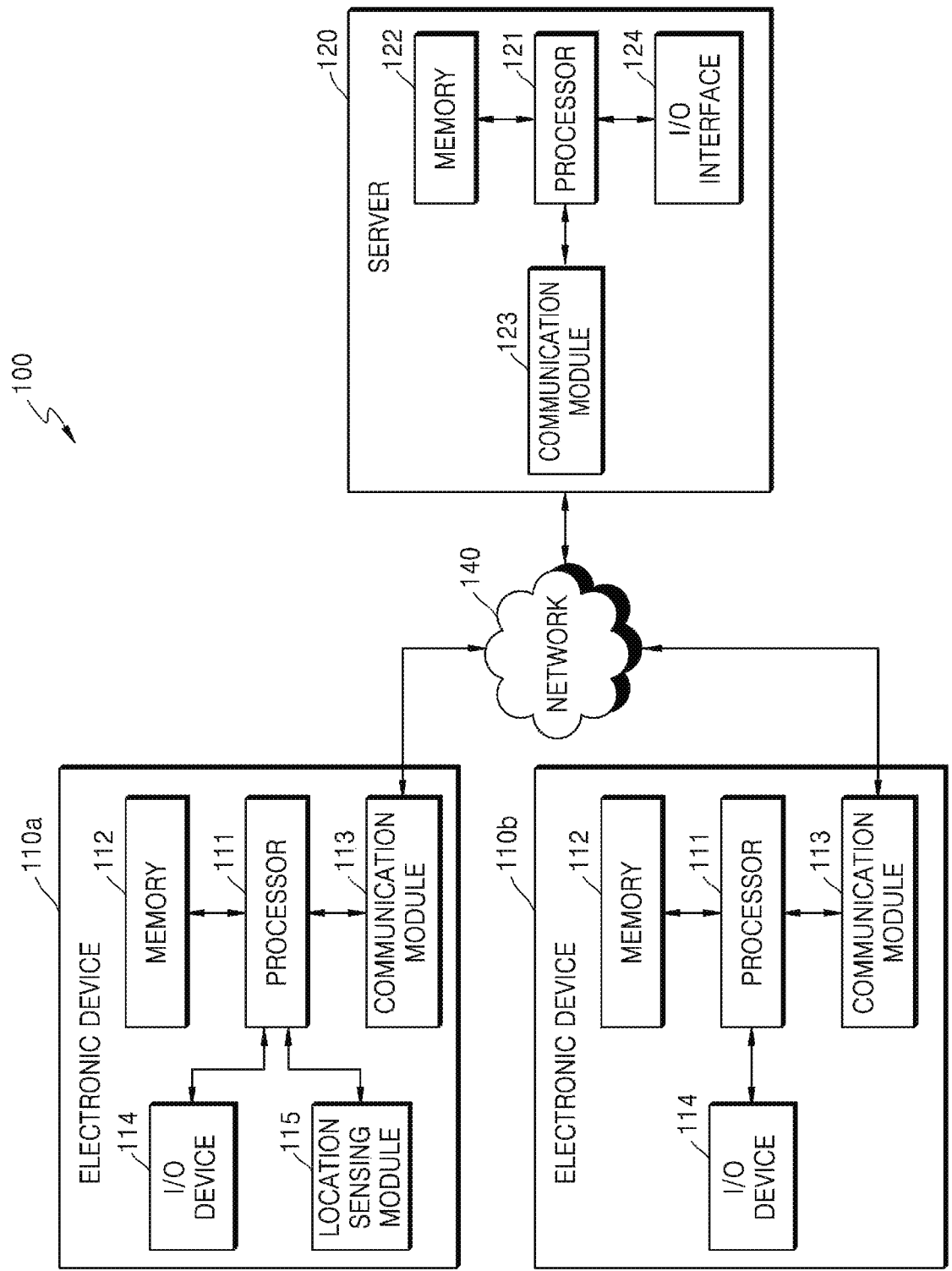
FIG. 3 illustrates internal configurations of a terminal and a server, according to an embodiment.

FIG. 3 illustrates the internal configurations of the terminal 110 and the server 120 according to an embodiment.

Referring to FIG. 3, a route guidance system 100 may include, for example, a first terminal 110a, a second terminal 110b, and a server 120 which may connect to a network 140. Although not shown in FIG. 3, the map server 130 may also connect to the network 140 and have the same configuration as the server 120.

The first terminal 110a and the second terminal 110b may each include a processor 111, a memory 112, a communication module 113, and an I/O device 114. The first terminal 110a may further include a location sensing module 115. The first terminal 110a and the second terminal 110b may be collectively referred to as the terminal 110.

The memory 112 is a recording medium that is capable of being read by the processor 111 of the terminal 110, and may include a permanent mass storage device such as random access memory (RAM), read-only memory (ROM), and a disk drive. The memory 112 may store an operating system and at least one program or application code. The memory 112 may store program code for connecting to the server 120 to receive walking route service according to the present disclosure.

The processor 111 may perform basic arithmetic, logic, and I/O operations, and execute, for example, the program code stored in the memory 112.

The communication module 113 may wirelessly connect to the network 140 to transmit data to the server 120 and receive data from the server 120. For example, the communication module 113 may transmit surrounding environment information, which is generated by the processor 111 of the terminal 110 according to the program code stored in the memory 112, to the server 120, and receive route guidance information from the server 120.

The I/O device 114 may receive an input from a user, transmit the input to the processor 111, and output information received from the processor 111 to the user. For example, the input device of the I/O device 114 may include a touch screen, a microphone, a button, and the like. The input device may include a keyboard or a mouse according to the type of the terminal 110. The output device of the I/O device 114 may include a display device such as an image display device or a speech output device such as a speaker or earphone.

For example, the input device may receive surrounding environment information input by the user and transmit it to the processor 111. The output device may output route guidance information, which is received from the processor 111, in the form of an image signal to the display device or output the route guidance information in the form of a speech signal to the speaker. The display device may display the route guidance information on a map. The display device may display, on a map, information such as a current location, a route that is being traveled, a guide, a remaining distance, an expected arrival time, and the like. The speech output device may output audio guidance according to the route guidance information. For example, the audio guidance may be in the form of natural language, e.g., "Go ahead to the left alley along N coffee shop ahead."

The location sensing module 115 may be a functional block capable of electronically detecting the current location of the first terminal 110a. According to an example, the location sensing module 115 may include a GNSS module configured to receive a satellite signal from a GNSS satellite and calculates a current location. According to another example, the location sensing module 115 may include a WPS module configured to calculate a current location from a WiFi signal.

According to another example, the location sensing module 115 may include a mobile communication module configured to estimate a current location by using location information of a base station which establishes wireless communication through a mobile communication network. According to another example, the location sensing module 115 may include a micro-electro mechanical systems (MEMS) sensor, an inertial sensor, a geomagnetic sensor, an acceleration sensor, and the like. The location sensing module 115 may include a photographing device (e.g., a camera) to detect a current location through image matching.

The first terminal 110a includes the location sensing module 115 but the second terminal 110b does not include the location sensing module 115. Although the second terminal 110b may establish wireless communication through the communication module 113, the second terminal 110b may be a portable electronic device that cannot detect a current location electronically.

The terminal 110 may further include other components in addition to the components illustrated in FIG. 3. For example, the terminal 110 may further include other components such as a transceiver, a camera, various types of sensors, a database, and the like.

The server 120 may include a processor 121, a memory 122, a communication module 123, and an I/O interface 124.

The memory 122 is a recording medium that is capable of being read by the processor 121 of the server 120, and may include a permanent mass storage device such as random access memory (RAM), read-only memory (ROM), and a disk drive. The memory 122 may store an operating system and at least one program or application code. The memory 122 may store program code for performing a method of identifying a current location and a method of providing walking route information according to the present disclosure. The program code for performing the method of identifying a current location will be referred to as location identification code, and the program code for performing the method of providing walking route information will be referred to as route guidance service code.

The processor 121 may perform basic arithmetic, logic, and I/O operations, and execute, for example, the program code stored in the memory 122, e.g., the location identification code and the route guidance service code.

The communication module 123 may wirelessly connect to the network 140 to transmit data to the terminal 110 and receive data from the terminal 110. For example, the communication module 123 may receive surrounding environment information from the terminal 110 and transmit, to the terminal 110, route guidance information generated by the processor 121 of the server 120 according to the route guidance service code.

The I/O interface 124 may provide an interface means with the I/O device 114.

Figure 4:
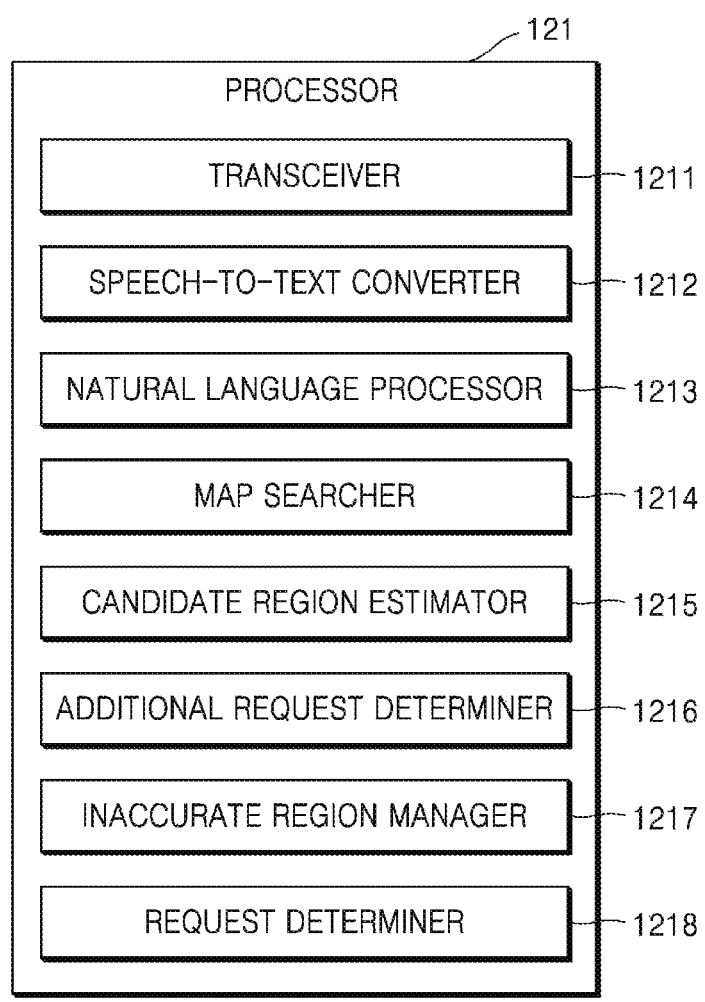
FIG. 4 illustrates an internal configuration of a server processor according to an embodiment.

FIG. 4 illustrates an internal configuration of the server processor 121 according to an embodiment.

Referring to FIG. 4, according to an embodiment, the processor 121 of the server 120 may include a transceiver 1211, a speech-to-text converter 1212, a natural language processor 1213, a map searcher 1214, a candidate region estimator 1215, an additional request determiner 1216, an inaccurate region manager 1217, and a request determiner 1218. These functional units 1211 to 1218 may be functional blocks executed by the processor 121, and program code for operating the processor 121 to function as the functional units 1211 to 1218 may be stored in the memory 122.

Each of the functional units 1211 to 1218 may be divided into a plurality of functional units or at least some of the functional units 1211 to 1218 may be merged into one functional unit. The processor 121 may include at least some of the functional units 1211 to 1218 or may further include a functional unit which performs a function different from those of the functional units 1211 to 1218. For example, the processor 121 may further include a functional unit for generating or obtaining route guidance information.

The transceiver 1211 may receive information or a request from the terminal 110 and transmit information or a request to the terminal 110. According to an example, the transceiver 1211 may receive surrounding environment information, which is input in natural language by a user, from the terminal 110. The surrounding environment information may be in the form of a speech signal or be text data.

The transceiver 1211 may transmit to the terminal 110 an additional request for the user to input additional surrounding environment information. The transceiver 1211 may receive the additional surrounding environment information, which is input in the natural language by the user, from the terminal 110 in response to the additional request.

According to another example, the transceiver 1211 may receive a route guidance request, which includes a current sensing location and a destination, from the terminal 110. The transceiver 1211 may transmit, to the terminal 110, route guidance information generated in response to the route guidance request.

According to another example, the transceiver 1211 may receive information about a current sensing location sensed by the terminal 110 using a position sensor. The transceiver 1211 may receive administrative district information from the terminal 110, and the administrative district information may be used to limit a range for searching for a reference place.

According to another example, the transceiver 1211 may transmit, to the terminal 110, confirmation request information about a current location identified by a method of identifying a current location according to the present disclosure, and receive confirmation of the confirmation request information from the terminal 110.

The speech-to-text converter 1212 may convert information or a request, which is in the form of a speech signal, when at least one of the surrounding environment information, the additional surrounding environment information, or the route guidance request which are input in the natural language to the terminal 110 by the user is in the form of a speech signal. The speech-to-text converter 1212 may use, for example, a Hidden Markov Model (HMM) algorithm. A sound model may be configured by statistically modeling speeches produced by various speakers and a language modeling may be configured by collecting corpora. According to another example, a speech input in natural language to the terminal 110 by a user may be converted into a character string in the terminal 110, and the character string may be transmitted from the terminal 110 to the server 120.

The speech-to-text converter 1212 may convert route guidance information and a character string corresponding to an additional request into a speech signal, and the speech signal may be provided to the terminal 110 through the transceiver 1211. According to another example, the terminal 110 may convert a character string into a speech signal and output the speech signal through a speech output device.

The natural language processor 1213 may analyze at least one of surrounding environment information, additional surrounding environment information, or a route guidance request, which is input in natural language form by a user, and convert a result of the analyzing into a form interpretable by the natural language processor 1213. The natural language processor 1213 may analyze morphemes of natural language sentence structure input by a user and add parts of speech to a result of analyzing the morphemes. Information or a request processed in natural language by the natural language processor 1213 may be in the form of a character string produced by the speech-to-text converter 1212. The information or the request processed in the natural language by the natural language processor 1213 may be in the form of a character string directly input to the terminal 110 by the user.

According to an example, the natural language processor 1213 may perform natural language processing on the surrounding environment information and extract place information and positional relationship information from the surrounding environment information. The place information refers to information about a reference place which is used to describe a current location in the surrounding environment information input by a user. The natural language processor 1213 may include a word dictionary including words extracted from a map stored in the map server 130, and extract place information by using the word dictionary. The positional relationship information refers to information representing a relationship between positions of the user and the reference place. The natural language processor 1213 may extract the positional relationship information by using a word (e.g., front, beside, between, behind, left, right, etc.) adjacent to a noun corresponding to the reference place extracted from the surrounding environment information. For example, when the surrounding environment information is in the form of natural language, e.g., "Near N store," the natural language processor 1213 may extract "N store" which is a reference place as place information and extract "near" as positional relationship information. The natural language processor 1213 may use a deep learning algorithm.

The map searcher 1214 may connect to the map server 130 to search for a reference place corresponding to the place information extracted by the natural language processor 1213. The map server 130 may search a map database for the reference place and provide a search result to the map searcher 1214, in response to a search request from the map searcher 1214. When one search result is provided from the map server 130, a searched-for place may be a reference place of the surrounding environment information input by the user. When two or more search results are provided from the map server 130, only one of searched-for places may be a reference place of the surrounding environment information input by the user and thus additional surrounding environment information may be necessary. Additional surrounding environment information may be received from the user and the number of search results provided from the map server 130 may be gradually reduced using the received additional surrounding environment information. The user may be requested to provide additional surrounding environment information until only one search result is provided from the map server 130.

For example, when the surrounding environment information is "Near N store," the map searcher 1214 may search a map for "N store." When there are a plurality of "N Stores" on the map, the reference place selected from among the plurality of N stores by the user may be identified, based on additional information about the surrounding environment information additionally specifying the reference place, e.g., "N bakery is located next to N store." or additional surrounding environment information additionally specifying the user's location, e.g., "A bus stop is in front of me."

The candidate region estimator 1215 may estimate a candidate region in which the user may be located by using a reference location and positional relationship information specified by one search result provided from the map server 130. When the user inputs surrounding environment information "Near N store," the user may be located near "N store" which is a reference place and a region near "N store" which is the reference place may be estimated as a candidate region. For example, when the user inputs surrounding environment information "I'm in Yeouido Park," all regions of Yeouido Park may be candidate regions. As such, when a range of a candidate region is wide enough to exceed a predetermined size, additional surrounding environment information may be necessary. When a size of the estimated candidate region is less than the predetermined size, the candidate region estimator 1215 may identify the estimated candidate region as the current location of the terminal 110.

The additional request determiner 1216 may identify whether a plurality of search results are provided from the map searcher 1214, and request the user to input additional surrounding environment information through the terminal 110 when a plurality of search results are provided.

The additional request determiner 1216 may compare the candidate region estimated by the candidate region estimator 1215 with a predetermined reference value, and request the user to input additional surrounding environment information through the terminal 110 when the candidate region exceeds the predetermined reference value. Here, the predetermined reference value may be set to a size unit such as area or length.

The inaccurate region manager 1217 may manage an inaccurate region. An inaccurate region refers to a region, the accuracy of the electronically sensed current location of which is not high, and may be either a region surrounded by tall buildings or a dead spot of a GNSS signal, e.g., a tunnel or the inside of a building. The first terminal 110a may electronically detect a current location thereof and periodically transmit information about a current sensing location to the server 120. The server 120 periodically receives information about current sensing locations, and when any one of the current sensing locations sharply changes to a predetermined reference value or more, the sharply changing sensing location may be included in an inaccurate region by the inaccurate region manager 1217. At least one of a current sensing location sensed before the sharply changing sensing location or a current sensing location sensed after the sharply changing sensing location may be included in the inaccurate region by the inaccurate region manager 1217. For example, when a current sensing location is moved by 10 m or more in 0.1 seconds, the current sensing location may be regarded as sharply changing. The above values are merely examples and may be differently set according to a surrounding environment, e.g., whether a corresponding location is a city or a rural region.

The inaccurate region manager 1217 may determine whether to request surrounding environment information, based on whether a current sensing location received from the first terminal 110a is included in the inaccurate region. The first terminal 110a may transmit information about a current sensing location to the server 120. When the current sensing location is not included in the inaccurate region, the inaccurate region manager 1217 may determine that it is not necessary to request the surrounding environment information and the server 120 may identify the current sensing location as a current location. However, when the current sensing location is included in the inaccurate region, the inaccurate region manager 1217 may determine that it is necessary to request the surrounding environment information and request the first terminal 110a to provide the surrounding environment information. In this case, the processor 121 of the server 120 may identify the current location of the first terminal 110a according to a method of identifying a current location according to the present disclosure.

The request determiner 1218 may receive information about a current sensing location sensed electronically by the first terminal 110a and determine an error range of the current sensing location. The error range may vary according to a current sensing location, and the request determiner 1218 may analyze current sensing locations received from the first terminals 110a and manage an error range of each of the current sensing locations, According to another example, the request determiner 1218 may calculate an error range of a current sensing location by using a GNSS and other related information received from a satellite navigation correction system.

The request determiner 1218 may generate a first route guidance path from the current sensing location to a destination. The request determiner 1218 may set virtual points of departure in a region within the error range of the current sensing location and generate a second route guidance path from each of the virtual points of departure to the destination. The request determiner 1218 may compare a distance of the first route guidance path with a distance of each of the second route guidance paths, and request the first terminal 110a to provide the surrounding environment information when a deviation between the distance of the first route guidance path and any one of the distances of the second route guidance path exceeds a reference value. Here, the reference value may be determined, based on the error range of the current sensing location. For example, the reference value may be set to 1.5 times the error range. In other words, the request determiner 1218 may request the first terminal 110a to provide the surrounding environment information when a route guidance path is changed to a large extent due to an error of the current sensing location as in the case of FIG. 1. For example, in the case of FIG. 1, a user is allowed to input surrounding environment information and thus the server 120 may sense that the user is located at least at the top (i.e., north) of the road. The server 120 may guide at least a path similar to the first path PT1 and may prevent a second path PT2 from being guided to the user.

Although not shown in FIG. 4, the processor 121 may further include a route guidance function for generating or obtaining route guidance information. The route guidance function may generate route guidance information, based on the current location of the terminal 110 identified by the candidate region estimator 1215 and a destination received from the terminal 110. The route guidance function may request the map server 130 to provide route guidance information and obtain the route guidance information from the map server 130. The route guidance function may be performed by the map searcher 1214.

Figure 5:
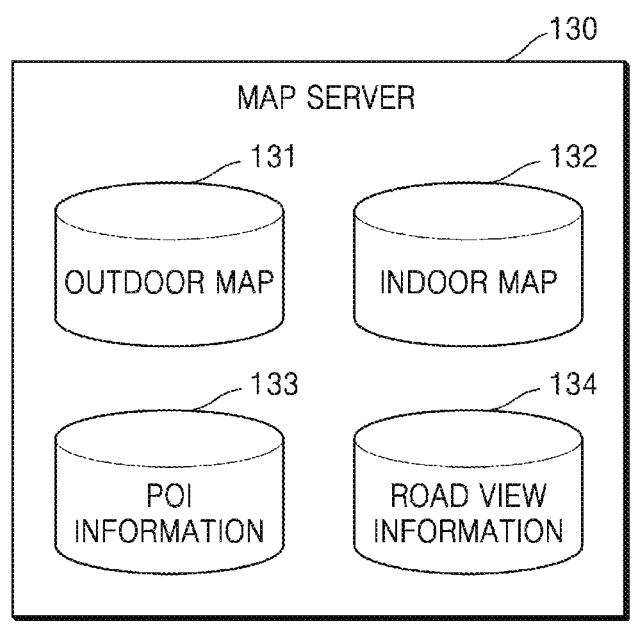
FIG. 5 illustrates a configuration of a map server according to an embodiment.

FIG. 5 illustrates a configuration of the map server 130 according to an embodiment.

Referring to FIG. 5, the map server 130 may store an outdoor map 131, an indoor map 132, points-of-interest (POI) information 133, and road view information 134. The outdoor map 131 is a concept distinguished from the indoor map 132 and refers to a general map. The outdoor map 131 may be a map of a certain country (e.g., South Korea) or a map of the entire Earth. The indoor map 132 is a map of the inside or basement of a building that is difficult to represent with the outdoor map 131. For example, the indoor map 132 may include a map of each floor of a large building such as a department store, and a map of an underground space such as the COEX Mall in Korea. The indoor map 132 may include a map of each of the floors of all buildings.

The POI information 133 includes information such as the names, addresses, telephone numbers, and the like of POIs displayed on the outdoor map 131 and the indoor map 132. The names or abbreviations of some of the POIs may be displayed on the outdoor map 131 and the indoor map 132. All the names of all the POIs may not be displayed on the outdoor map 131 or the indoor map 132 according to a scale of the outdoor map 131 or the indoor map 132. The POI information 133 may be used to search for a reference place.

The road view information 134 may include image information captured in all directions along most roads on the outdoor map 131 and the indoor map 132. The road view information 134 may be used to search for a reference place, such as "a blue sign building," "a flower bed," or "a telephone booth," which is not managed using the POI information 133. The map searcher 1214 may search for a "blue sign" from the image information of the road view information 134.

Although not shown in FIG. 5, when the map server 130 receives a route guidance request including a point of departure and a destination, the map server 130 may generate route guidance information, including an optimum moving path, by using the outdoor map 131 and the indoor map 132 and output the route guidance information.

Figure 6:
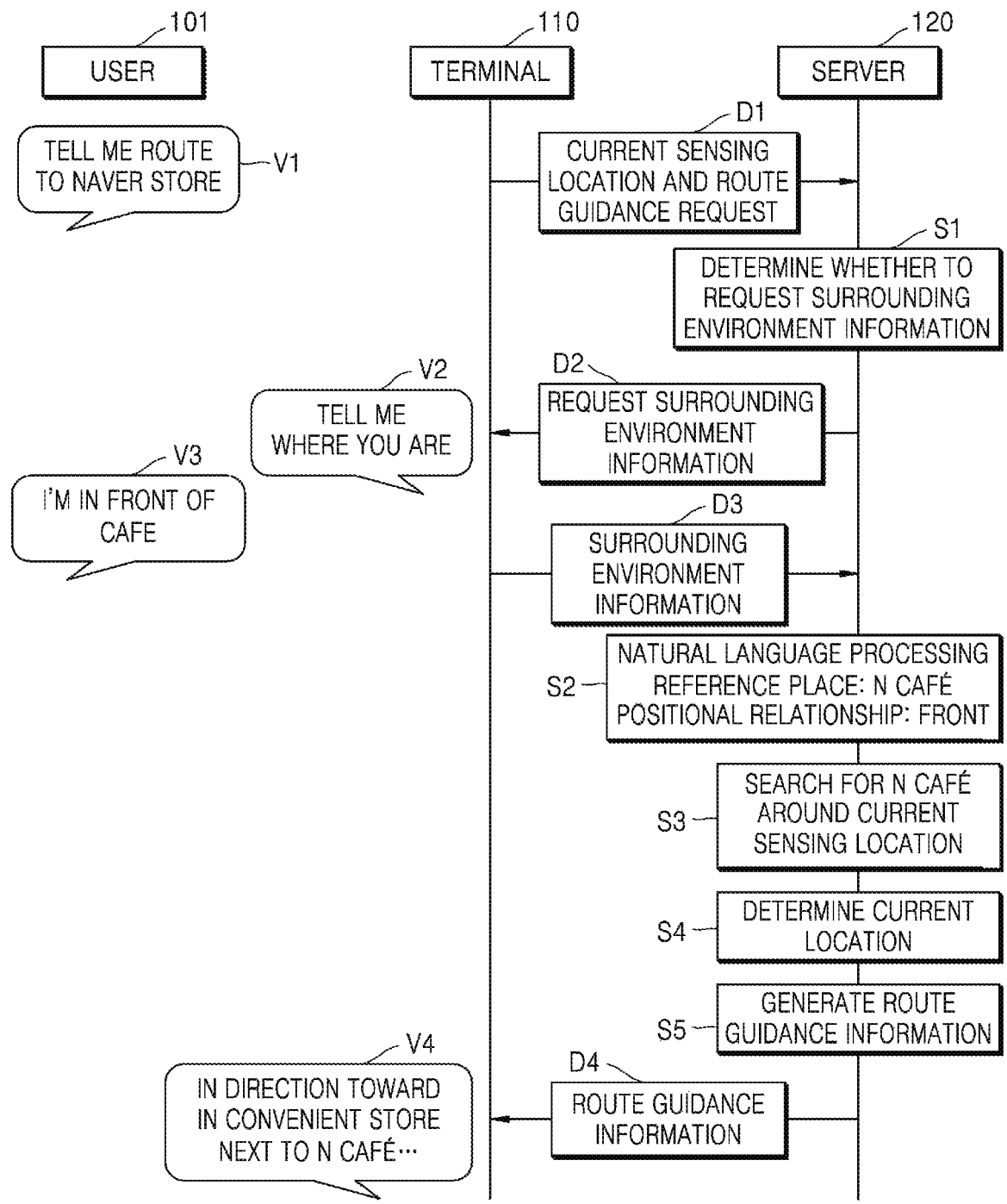
FIG. 6 is a diagram for explaining a method of providing route guidance information according to an embodiment.

FIG. 6 is a diagram for explaining a method of providing route guidance information according to an embodiment.

Referring to FIG. 6, a user 101 may request the server 120 to provide route guidance information through the terminal 110, and the server 120 may provide the user 101 with the route guidance information in response to the request. In FIG. 6, it is assumed, for example, that the user 101 verbally requests the route guidance information, and the terminal 110 outputs the route guidance information in the form of speech. However, the above assumption is an example, and the user 101 may request the route guidance information in text and the terminal 110 may output the route guidance information to the user 101 in a visual manner using a map and text.

According to the embodiment of FIG. 6, the user 101 may provide the terminal 110 with a speech V1 "Tell me a route to a Naver store." According to an example, the terminal 110 may extract "Naver store" as a destination from the speech V1 and transmit a route guidance request D1 for the destination to the server 120. The terminal 110 may transmit a current sensing location sensed by the terminal 110, together with the route guidance request D1. When the terminal 110 is a terminal, such as the second terminal 110*b*, which cannot sense a current location, the terminal 110 may transmit the route guidance request D1 excluding the current sensing location to the server 120. According to another example, the terminal 110 may directly transmit the speech V1 to the server 120.

The server 120 may receive the route guidance request D1, and determine whether to request surrounding environment information by evaluating the reliability of the current sensing location included in the route guidance request D1 (S1). For example, when it is determined by the inaccurate region manager 1217 that the current sensing location is included in an inaccurate region, the server 120 may provide a surrounding environment information request D2 to the terminal 110. According to another example, the server 120 may determine whether surrounding environment information is necessary by using the request determiner 1218, based on an error range of the current sensing location, and transmit the surrounding environment information request D2 to the terminal 110 when the surrounding environment information is necessary. When the current sensing location is not included in the route guidance request D1, the server 120 may transmit the surrounding environment information request D2 to the terminal 110. The surrounding environment information request D2 output from the server 120 to the terminal 110 may be in the form of a speech signal or the form of text. According to another example, the surrounding environment information request D2 may be in the form of code corresponding thereto.

The terminal 110 may receive the surrounding environment information request D2 from the server 120, and output a speech V2, e.g., "Tell me where you are," which is interpretable by the user 101. The user 101 may utter speech V3, e.g., "I'm in front of N Café," in response to the speech V2. The terminal 110 may transmit to the server 120 the speech V3 as surrounding environment information D3. According to another example, the terminal 110 may speech-to-text convert the speech V3 and transmit to the server 120 the surrounding environment information D3 which is in the form of a character string.

The server 120 may perform natural language processing on the surrounding environment information D3 by using the natural language processor 1213 (S2). According to an example, when the surrounding environment information D3 is in the form of a speech signal, the server 120 may perform speech-to-text conversion by using the speech-to-text converter 1212 prior to the natural language processing. The natural language processor 1213 may perform natural language processing on the surrounding environment information D3 to extract a reference place and a positional relationship. In this example, "N café" may be extracted as the reference place and "front" may be extracted as the positional relationship.

The server 120 may search the map server 130 for "N café," which is the reference place, by using the map searcher 1214. When several places are searched for as "N café," the user 101 may be requested to provide additional surrounding environment information. When one place is searched for as "N café," the server 120 may estimate a candidate region in which the user 101 may be currently located by using the searched-for place and "front" which is the positional relationship information. When the candidate region satisfies a predetermined criterion, the server 120 may determine the candidate region as a current location (S4). The server 120 may generate route guidance information from the current location determined in operation S4 to a destination included in the route guidance request D1 (S5). The server 120 may connect to the map server 130 so as to request the route guidance information, and obtain the route guidance information from the map server 130.

The server 120 may transmit the route guidance information D4 generated in operation S5 to the terminal 110. The terminal 110 may output the route guidance information to the user 101 by outputting a speech V4, e.g., "in a direction toward N convenience store next to N café." As in this example, the route guidance information D4 may be in the form of a speech signal or the form of a character string. In the case of the character string, the terminal 110 may generate the speech V4 by using a text-to-speech conversion function. The route guidance information D4 may be predetermined code, and the terminal 110 may display a map corresponding to the predetermined code by using a map application and further display a route guidance path on the map.

The embodiment of FIG. 6 is a representative embodiment and the present disclosure is not limited thereto. Various embodiments will be described in more detail with reference to FIGS. 7 to 14 below.

Figure 7:
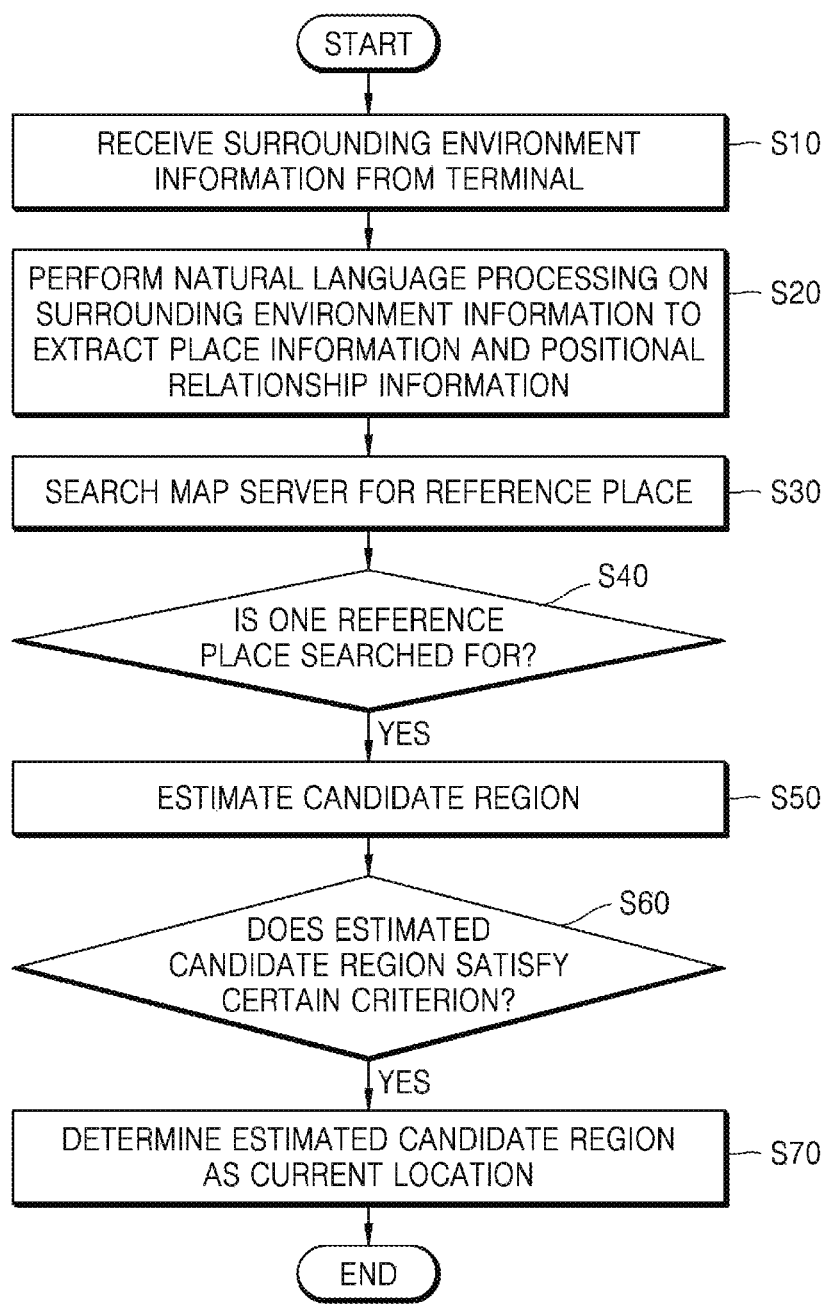
FIG. 7 is a flowchart of a method of identifying a current location, the method being performed by a server, according to an embodiment.

FIG. 7 is a flowchart of a method of identifying a current location, the method being performed by the server 120, according to an embodiment.

Referring to FIG. 7, the server 120 may receive surrounding environment information from the terminal 110 through the transceiver 1211 (S10). The user 101 who is carrying the terminal 110 may input, to the terminal 110, surrounding environment information that the he or she knows in advance or grasps with his or her eyes, and the terminal 110 may transmit the input surrounding environment information to the server 120.

For example, the surrounding environment information may be a phrase written in natural language by the user 101 to describe a location of the user 101. The surrounding environment information may include an administrative district, a place name, an address, and a landmark name which known to the user 101 in advance. The surrounding environment information may include terrains, facilities, store names, signs, road names, etc. which are visually recognized by the user 101. The terrains may be mountains, hills, rivers, and the like, and the facilities may be pedestrian overpasses, roads, stops, and the like. The surrounding environment information may include some features of a certain building, such as a blue door, a red brick building, a green roof, a yellow signage, and the like.

The surrounding environment information may be in the form of text or in the form of a speech signal. The user 101 may input the surrounding environment information to the terminal 110 as speech or text. The terminal 110 may convert the surrounding environment information which is in the form of a speech signal into text and transmit a conversion result to the server 120, or may directly transmit the surrounding environment information which is in the form of a speech signal to the server 120.

The server 120 may perform natural language processing on the surrounding environment information received in operation S10 by using the natural language processor 1213 to extract place information and positional relationship information (S20). The place information relates to a reference place specified in the surrounding environment information, and the reference place may refer to an object used by the user 101 to describe a location of the user 101. Although the reference place is referred to above, a fixed object, such as a roadside tree, a telephone booth, a bus stop, a flower bed, or a crosswalk, may also be regarded as the reference place. The positional relationship information is information representing a positional relationship between the reference place and the user. For example, the user 101 may describe the reference place with respect to himself or herself, saying, "there is an N convenience store on my left" or describe his or her location with respect to the reference place, saying, e.g., "I am in front of the N convenience store." The natural language processor 1213 may extract a reference place and a positional relationship between the user 101 and the reference place from the surrounding environment information input by the user 101 by using, for example, a deep learning algorithm.

The server 120 may search the map server 130 for a reference place corresponding to the place information by using the map searcher 1214 (S30). The map server 130 may include a map database. The map database may include not only the outdoor map 131 but also the indoor map 132, and store the POI information 133 and the road view information 134. The map server 130 may be integrated with the server 120 and thus be part of the server 120.

When one reference place is searched for by the map searcher 1214 (S40), the server 120 may estimate a candidate region in which the user 101 may be located by using the candidate region estimator 1215, based on the searched-for reference place and the positional relationship information (S50). The candidate region estimator 1215 may estimate a candidate region by setting a plurality of candidate locations around the reference place, determining whether each of the set candidate locations matches the positional relationship information with respect to the reference place, and including, as candidate regions, candidate locations matching the positional relationship information.

When the estimated candidate region satisfies a certain criterion (S60), the server 120 may determine the candidate region satisfying the criterion as the current location of the user 101 (S70). The current location of the user 101 determined in operation S70 may be used in other services, e.g., a route guidance service, a location sharing service, and the like.

Figure 8:
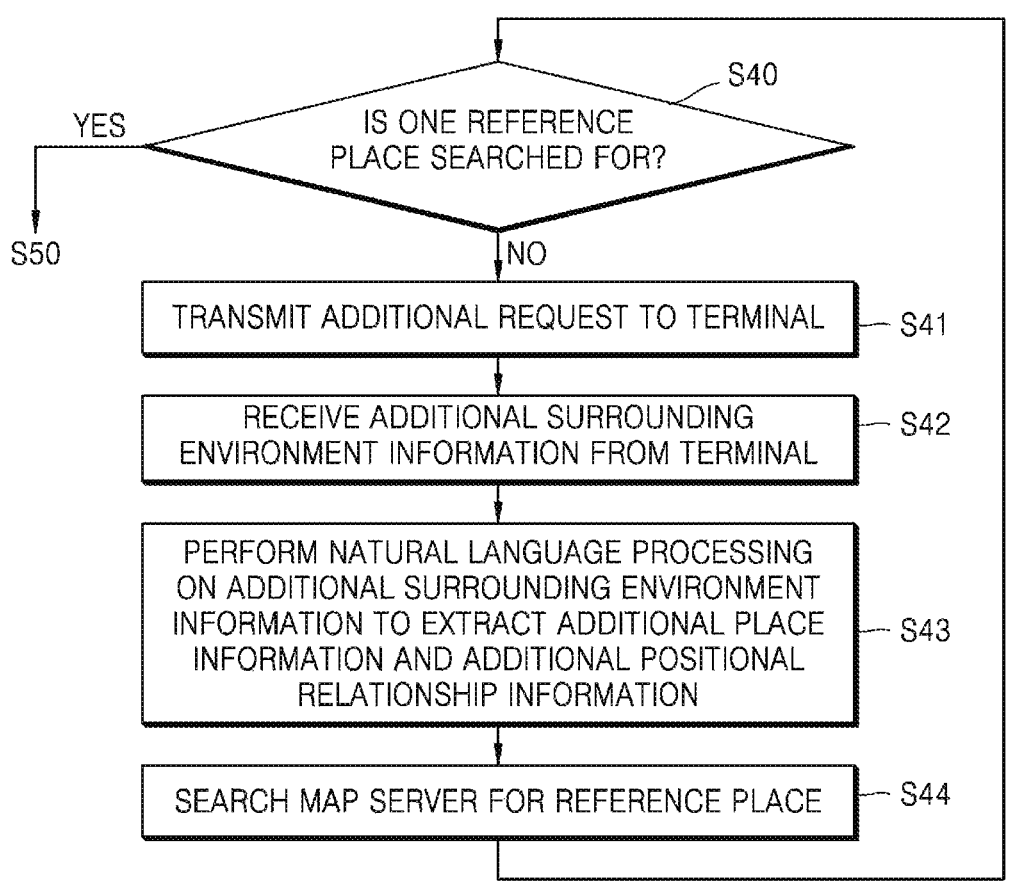
FIG. 8 is a flowchart of a method of identifying a current location, the method being performed by a server, according to another embodiment.

FIG. 8 is a flowchart of a method of identifying a current location, the method being performed by the server 120, according to another embodiment.

Referring to FIG. 8, the server 120 may determine whether one reference place is searched for by the map searcher 1214 by using the additional request determiner 1215 (S40). As described above with reference to FIG. 7, when one reference place is searched for by the map searcher 1214, the server 120 may perform operation S50. However, when two or more reference places are searched for by the map searcher 1214, the current location of the user 101 cannot be specified.

When a plurality of reference places are searched for by the map searcher 1214, the server 120 may transmit an additional request to the terminal 110 (S41). The additional request is transmitted to request the user 101 to input additional surrounding environment information. The terminal 110 may receive the additional request and output a speech, e.g., "Current location is not identified. Tell me more about your current location" in response to the additional request.

The user 101 may input additional surrounding environment information in response to the additional request. The additional surrounding environment information may be information further specifying the reference place specified in the surrounding environment information. For example, when the reference place is an "N convenience store," additional surrounding environment information such as "There is an N bookstore on the right side of the N convenience store" may be input. The additional surrounding environment information may be information describing the current location of the user 101, based on a new reference place. For example, additional surrounding environment information such as "Naver department store is located on the left" may be input.

The server 120 may receive additional surrounding environment information input in natural language by the user 101 from the terminal 110 (S42).

The server 120 may extract additional place information and additional positional relationship information by performing natural language processing on the additional surrounding environment information in a method substantially the same as in operation S20 of performing natural language processing on the surrounding environment information (S43). The additional place information is information about an additional reference place specified in the additional surrounding environment information. For example, in the above example, when additional surrounding environment information such as "There is an N book store on the right side of the N convenience store" is received, the N convenience store may be a reference place and the N book store may be an additional reference place. As another example, when additional surrounding environment information such as "Naver department store is located on the left" is received, the Naver department store may be an additional reference place. The additional positional relationship information is information representing a positional relationship of the additional reference place. In an example in which the N bookstore is an additional reference place, the positional relationship information indicates the positional relationship between the N convenience store which is a reference place and the N bookstore which is the additional reference place. In an example in which the Naver department store is an additional reference place, the positional relationship information indicates the positional relationship between the user 101 and the Naver department store.

The server 120 may search the map server 130 for a reference place again by using the map searcher 1214, based on the place information and the additional place information (S44). In an example in which the N bookstore is an additional reference place, a reference place with the N bookstore on the left side thereof may be searched for among the reference places searched for in operation S30 (i.e., the N bookstore). Similarly, in an example in which the Naver department store is an additional reference place, a reference place near the Naver department store may be searched for among the reference places searched for in operation S30.

The server 120 may repeatedly perform operations S41 to S44 until only one reference place is searched for in operation S44. Therefore, when only one reference place is searched for in operation S40, the method may proceed to operation S50.

Figure 9:
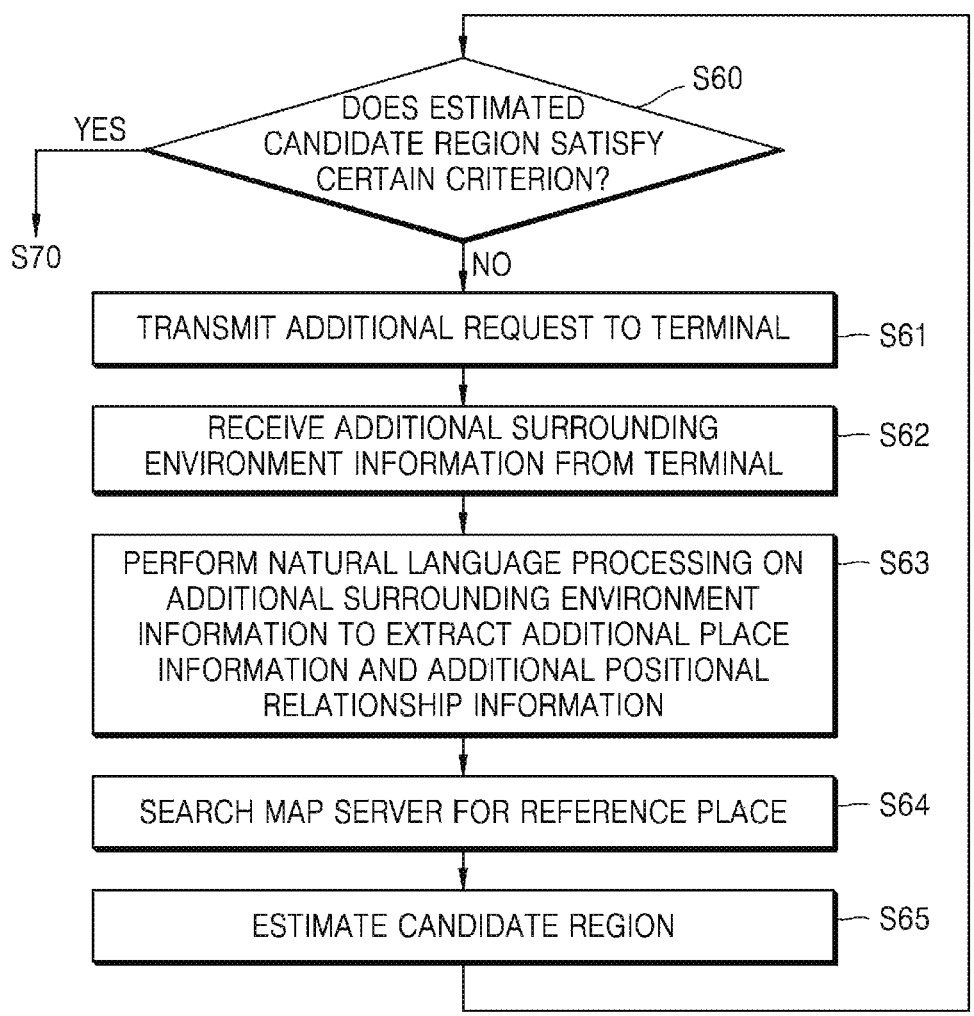
FIG. 9 is a flowchart of a method of identifying a current location, the method being performed by a server, according to another embodiment.

FIG. 9 is a flowchart of a method of identifying a current location, the method being performed by the server 120, according to another embodiment.

Referring to FIG. 9, the server 120 may determine whether a candidate region, which is estimated by the candidate region estimator 1215, satisfies a certain criterion by using the additional request determiner 1215 (S60). As described above with reference to FIG. 7, when the estimated candidate region satisfies the criterion, the server 120 may proceed to operation S70 to identify the estimated candidate region as the current location of the user 101. The criterion may be set to a size of a candidate region. Here, the size may refer to an area or a maximum distance or length. When the candidate region is extremely wide or long, the current location of the user 101 cannot be specified.

When the candidate region estimated in operation S60 does not satisfy the criterion, the server 120 may transmit an additional request to the terminal 110 (S61). The user 101 may input additional surrounding environment information in response to the additional request. The server 120 may receive additional surrounding environment information input in natural language by the user 101 from the terminal 110 (S62). The server 120 may perform natural language processing on the additional surrounding environment information to extract additional place information and additional positional relationship information (S63).

The server 120 may search the map server 130 for a reference place again by using the map searcher 1214, based on the place information and the additional place information (S64). The server 120 may estimate a candidate region in which the user 101 may be located, based on the reference place searched for in operation S64, and the positional relationship information and the additional positional relationship information (S65). A candidate region is estimated using only the reference place and the positional relationship information in operation S50, whereas in in operation S65, the additional positional relationship information is additionally used and thus a size of an estimated candidate region may be further reduced.

The server 120 may repeatedly perform operations S61 to S65 until the candidate region estimated in operation S65 satisfies the criterion. Therefore, when the candidate region estimated in operation S60 satisfies the criterion, the method may proceed to operation S70.

Figure 10:
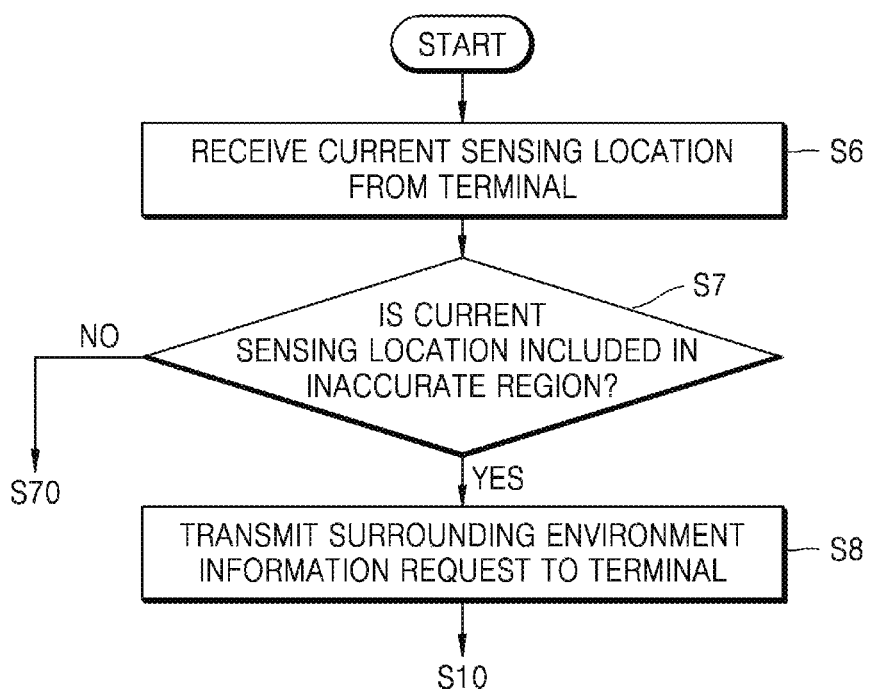
FIG. 10 is a flowchart of a method of identifying a current location, the method being performed by a server, according to another embodiment.

FIG. 10 is a flowchart of a method of identifying a current location, the method being performed by the server 120, according to another embodiment.

Referring to FIG. 10, the terminal 110 may include a position sensor or the location sensing module 115 to sense a current location. The terminal 110 may transmit information about a current sensing location sensed by the position sensor while transmitting surrounding environment information, prior to transmitting surrounding environment information in operation S10. The current sensing location includes a sensing error, and the sensing error may vary according to the current sensing location. For example, when the position sensor uses a GNSS signal, a sensing error may be several meters or more and increases between skyscrapers. When the terminal 110 is located in a tunnel, an underground space, or a building, the GNSS signal may not be received and thus a current location may be sensed by a different method, e.g., using WPS technology. However, a current sensing location sensed by the WPS technology may also have a sensing error of several meters or more. In the present specification, the term "current sensing location" refers to a location electronically sensed by the position sensor or the location sensing module 115 mounted in the terminal 110.

In the embodiment of FIG. 10, the terminal 110 may transmit a current sensing location to the server 120 before operation S10. For example, the terminal 110 may transmit a current sensing location while requesting the server 120 to provide a service. For example, information about the current sensing location and a destination may be transmitted together while requesting the server 120 to provide a route guidance service. According to an example, the terminal 110 may transmit to the server 120 a current sensing location periodically and substantially continuously so as to receive a service from the server 120. For example, a current sensing location may be transmitted every 0.1 seconds.

The server 120 may receive a current sensing location from the terminal 110 (S6). The server 120 may determine whether the current sensing location is included in an inaccurate region (S7). The inaccurate region is a region for which a current sensing location is predicted to have an error greater than or equal to a predetermined reference value, and may be managed by the server 120. The server 120 may manage the inaccurate region, based on current sensing locations received from the terminals 110. For example, when the current sensing locations received from the terminals 110 sharply change to a predetermined reference value or more, the server 120 may set an inaccurate region such that the current sensing locations are included in the inaccurate region. When the terminal 110 is located in an inaccurate region, e.g., a high building forest, the terminal 110 calculates a current sensing location, based on a GNSS signal reflected by a building and thus the current sensing location may sharply change. When the terminal 110 comes out of a tunnel or a building, the current sensing location of the terminal 110 may sharply change. The server 120 may include the sharply changing current sensing location in the inaccurate region.

When the current sensing location is included in the inaccurate region, the server 120 may transmit a surrounding environment information request to the terminal 110 so that the user 101 may input surrounding environment information (S8). However, when the current sensing location is not included in the inaccurate region, the method may proceed to step S70 and the current sensing location may be determined as a current location.

In the present embodiment, when a current sensing location is received from the terminal 110, the server 120 may search for a reference place within a region set with respect to the current sensing location in operation S30. For example, a reference place may be searched for within a distance (e.g., 10 m or 20 m) from the current sensing location. A distance for determination of a search range may vary depending on the current sensing location. In this case, it is highly probable that only one reference place will be searched for in operation S30 and thus the current location of the terminal 110 may be quickly identified.

In another embodiment, the server 120 may identify whether the user 101 is located indoors or outdoors, based on the current sensing location. When a plurality of reference places are searched for in operation S40, the server 120 may request additional surrounding environment information differently according to whether the user 101 is located indoors or outdoors. For example, when the user 101 is located indoors such as a department store or an underground shopping mall, the server 120 may guide the user 101 to input additional surrounding environment information with respect to a shop by transmitting to the terminal 110 an additional request saying, "Tell me the name of a nearest stop" or "Tell me the name of a shop on the left or the right." When the user 101 is located outdoors, in order to guide the user 101 to input road name and building number as additional surrounding information, the server 120 may transmit to the terminal 110 an additional request saying, "Tell me the name and address plate of a nearby road."

Figure 11:
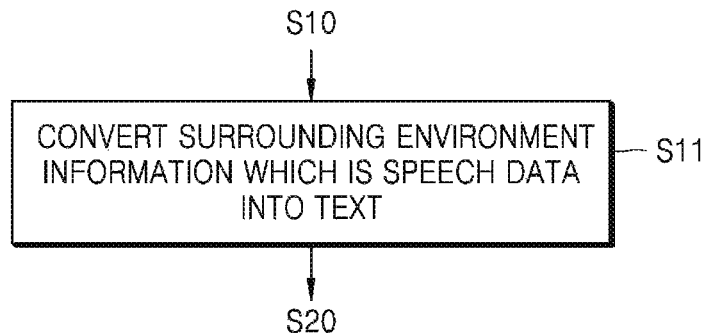
FIG. 11 is a flowchart of a method of identifying a current location, the method being performed by a server, according to another embodiment.

FIG. 11 is a flowchart of a method of identifying a current location, the method being performed by the server 120, according to another embodiment.

Referring to FIG. 11, the user 101 may verbally input surrounding environment information to the terminal 110. The terminal 110 may receive surrounding environment information which is in the form of a speech signal and transmit this information in the form of speech data to the server 120.

In this case, the server 120 may receive the surrounding environment information which is in the form of speech data and convert the surrounding environment information which is in the form of speech data into text by using the speech-to-text converter 1212 (S11). The server 120 may perform natural language processing on the surrounding environment information which is converted into text (S20). The speech-to-text converter 1212 may use, for example, a Hidden Markov Model (HMM) algorithm, a deep learning algorithm, or a combination thereof.

Figure 12:
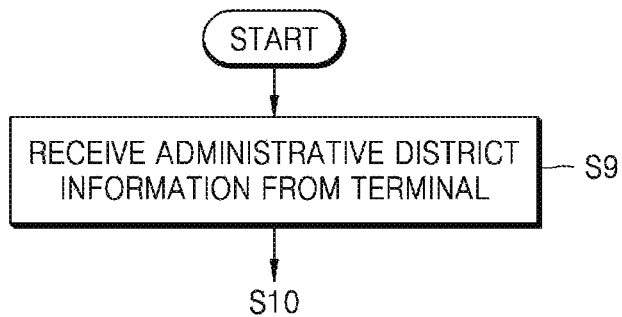
FIG. 12 is a flowchart of a method of identifying a current location, the method being performed by a server, according to another embodiment.

FIG. 12 is a flowchart of a method of identifying a current location, the method being performed by the server 120, according to another embodiment.

Referring to FIG. 12, the server 120 may receive administrative district information from the terminal 110 (S9). The administrative district information may be information input in text or verbally by the user 101 to the terminal 110. According to another example, the administrative district information may be information obtained by the terminal 110 through context analysis. The administrative district information may be information about an administrative district such as a country, a state, or a city in which the user 101 is located. In this case, in operation S30, the server 120 may search a corresponding administrative district for a reference place by using the administrative district information. In this case, a search range in operation S30 decreases and thus the current location of the terminal 110 may be quickly identified.

In another embodiment, the server 120 may request the terminal 110 to provide the administrative district information. For example, the terminal 110 receiving an administrative district information request from the server 120 may output a speech or text saying, "Tell me an administrative district such a district or town where you are." The user 101 may input the administrative district information into the terminal 110 in response to the administrative district information request.

Figure 13:
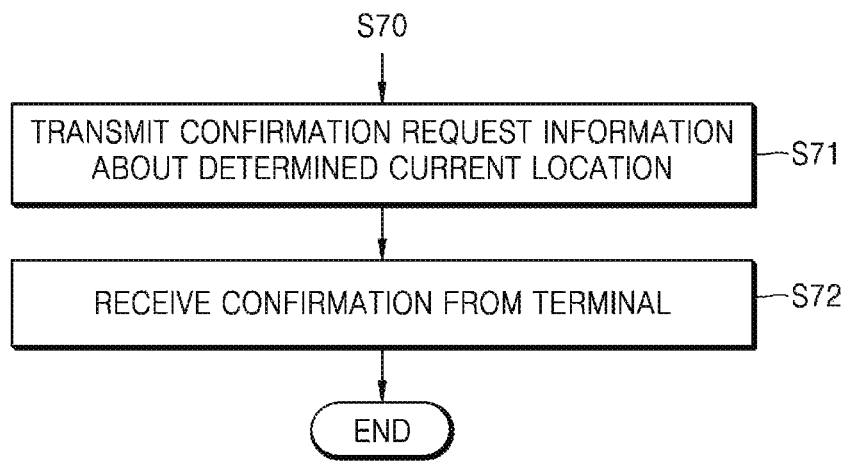
FIG. 13 is a flowchart of a method of identifying a current location, the method being performed by a server, according to another embodiment.

FIG. 13 is a flowchart of a method of identifying a current location, the method being performed by the server 120, according to another embodiment.

Referring to FIG. 13, the server 120 may transmit, to the terminal 110, confirmation request information about the current location determined in operation S70 (S71). In this case, the confirmation request information may be information that is not input by the user 101 as surrounding environment information or additional surrounding environment information. For example, when the user 101 provides information about "N convenience store and N bookstore on a left side thereof," the confirmation request information may be new information asking "Is there N hospital on the second floor of a building where the N convenience store is located?"

The user 101 may give an affirmative or negative answer in response to the confirmation request information. The terminal 110 may transmit the answer of the user 101 to the server 120. When the user 101 gives an affirmative answer, the server 120 may receive confirmation of the confirmation request information from the terminal 110 (S72). After receiving the confirmation from the terminal 110, the server 120 may provide a service such as a route guidance information providing service.

Figure 14:
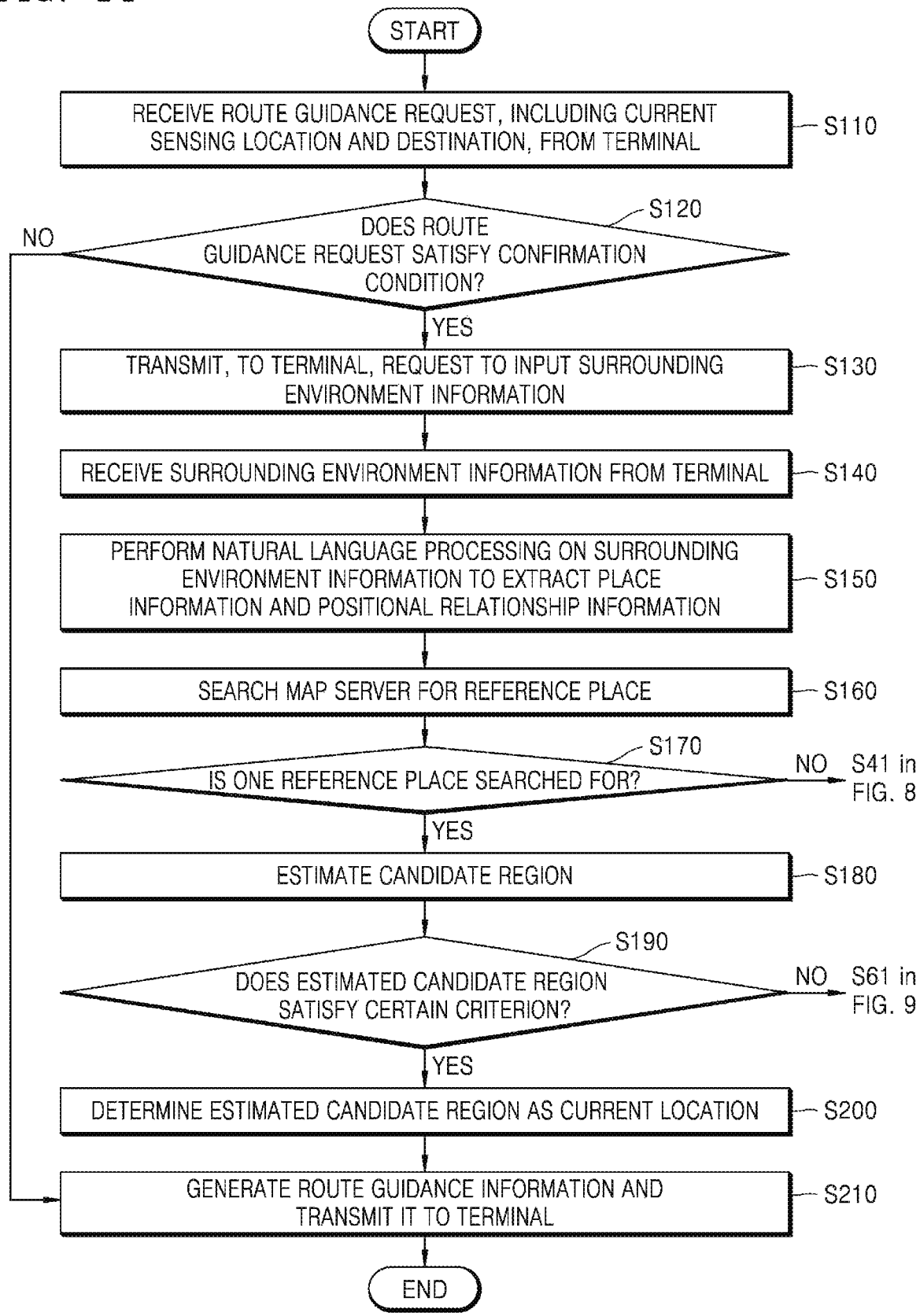
FIG. 14 is a flowchart of a method of identifying walking route information, the method being performed by a server, according to an embodiment.

FIG. 14 is a flowchart of a method of identifying walking route information, the method being performed by the server 120, according to an embodiment.

The method of providing walking route information illustrated in FIG. 14 includes the method of identifying a current location of FIG. 7. For example, operations S140 to S200 of FIG. 14 are substantially the same as operations S10 to S70 of FIG. 7. Operations S140 to S200 are as described above with reference to FIG. 7 and thus will not be redundantly described here. The methods of other embodiments described above with reference to FIGS. 8 to 13 may also apply to the method of providing walking route information of FIG. 14.

The server 120 may receive a route guidance request from the terminal 110 (S110). The route guidance request includes information about a current sensing location and a destination.

The server 120 may determine whether the route guidance request satisfies a confirmation condition (S120). In one embodiment, the confirmation condition may include a case in which the current sensing location is included in an inaccurate region. The inaccurate region has been described above with reference to FIG. 10 and is not redundantly described here. When the current sensing location received together with the route guidance request is included in the inaccurate region, the server 120 may transmit to the terminal 110 a request to input surrounding environment information (S130). When the current sensing location is not included in the inaccurate region and does not satisfy the confirmation condition, the server 120 may determine the current sensing location as a current location, generate route guidance information from the current sensing location to a destination, and transmit the route guidance information to the terminal 110 (S210).

In another embodiment, the server 120 may perform the determination of operation S120 by using the request determiner 1218. The server 120 may determine an error range according to the current sensing location. The error range may be stored in advance differently according to the current sensing location or be statistically managed. The error range may be calculated based on GNSS correction information received from a satellite navigation correction system.

The server 120 may generate a first route guidance path from the current sensing location to a destination. The server 120 may set a plurality of virtual points of departure in an error region set based on the current sensing location and generate second route guidance paths to the destination from the plurality of virtual points of departure. In this case, the confirmation condition may include a case in which the difference between a distance of the first route guidance path and a distance of any one of the second route guidance paths exceeds a predetermined reference value. Here, the reference value may be set based on the error range of the current sensing location. For example, the reference value may be set to 1.5 times the error range. 1.5 times the error range corresponds to a path difference when a movement is made at right angles due to an obstacle between the current sensing location and a virtual point of departure.

The distances between the current sensing location and all the virtual points of departure in the error zone are actually within the error range. When route guidance paths to the destination from all the virtual points of departure in the error zone are substantially the same, the distance difference between the route guidance paths will be only within an error range. However, when a completely different route guidance path is generated at a certain location within the error zone as illustrated in FIG. 1, it may cause great confusion and inefficiency to the user 101 and thus it is necessary to receive surrounding environment information from the user 101 and identify the current location of the user 101 more accurately.

When all the differences between the distance of the first route guidance path and the distances of the second route guidance paths are less than or equal to a reference value, the user 101 may move in an substantially optimal route no matter which route the user 101 moves. Thus, the server 120 may determine the current sensing location as a current location, generate route guidance information from the current sensing location to the destination, and transmit the route guidance information to the terminal 110 (S210). However, when the difference between the distance of the first route guidance path and any one of the distances of the second route guidance paths exceeds the reference value, the server 120 may transmit to the terminal 110 a request to input surrounding environment information (S130).

The terminal 110 may transmit surrounding environment information input by the user 101 in response to the request, and the server 120 may receive the surrounding environment information from the terminal 110 (S140). As described above with reference to FIG. 7, the server 120 may identify the current location of the user 101, based on the surrounding environment information (S150 to S200).

The server 120 may set the current location determined in operation S120 as a point of departure, generate route guidance information from the current location to the destination, and transmit the route guidance information to the terminal 110 (S210). The server 120 may generate the route guidance information by using the map server 130. The terminal 110 may output the route guidance information, which is received from the server 120, in the form of speech or may display the route guidance information in the form of map information on a display. A moving route and route guidance information may be displayed on the map image.

The user 101 may accurately move to the destination according to the route guidance information to the destination from the current location determined based on the surrounding environment information input by the user 101. Even when the user 101 goes to an area where a GNSS signal cannot be received, such as an underground shopping mall or a department store, the user 101 may receive the route guidance information according to the present disclosure and move to a desired destination accurately and quickly.

According to various embodiments of the present disclosure, a user's current location can be determined more accurately, based on location information provided by the user through a position sensor via which the user may provide location information. Therefore, it is possible to provide the user with more accurate walking route information.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be modified in various ways. Such modifications are not to be regarded as a departure from the disclosure, and all such modifications are intended to be included within the scope of the disclosure.

What is claimed is:

1. A method of identifying a current location, performed by a server having wireless communication with a terminal, the method comprising:
   receiving, from the terminal, surrounding environment information including a reference place and a positional relationship between the reference place and a user, the surrounding environment information being input in the terminal in a natural language of the user by the user;

performing natural language processing on the surrounding environment information to extract place information about the reference place and positional relationship information about the positional relationship between the reference place and the user;

searching a map database for the reference place corresponding to the place information;

transmitting to the terminal a first additional request for the user to input first additional surrounding environment information;

receiving, from the terminal, first additional surrounding environment information input in natural language by the user in response to the first additional request;

performing natural language processing on the first additional surrounding environment information to extract first additional place information about a first additional reference place input by the user and first additional positional relationship information about the first additional reference place; and searching the map database for the reference place corresponding to the place information and the first additional place information, wherein the transmitting of the first additional request, the receiving of the first additional surrounding environment information, the extracting of the first additional place information and the first additional positional relationship information, and the searching for the reference place are repeatedly performed, until only one reference place corresponding to the place information and the first additional place information is found;

estimating a candidate region in which the user is likely to be located, based on the searched-for one reference place and the positional relationship information; and determining the candidate region as the user's current location.

2. The method of claim 1, wherein a candidate location matching the positional relationship information with respect to the reference place among candidate locations around the searched-for reference place is included in the candidate region.

3. The method of claim 1, further comprising,
after determining that the estimated candidate region has exceeded a predetermined criterion, transmitting to the terminal second additional request for the user to input second additional surrounding environment information;

receiving, from the terminal, second additional surrounding environment information input in natural language by the user, in response to the second additional request;

performing natural language processing on the second additional surrounding environment information to extract second additional place information about a second additional reference place input by the user and second additional positional relationship information about the second additional reference place; and searching the map database for the reference place corresponding to the place information and the second additional place information, wherein the transmitting of the second additional request, the receiving of the second additional surrounding environment information, the extracting of the second additional place information and the second additional positional relationship information, and the searching of the map database for the reference place are repeatedly performed, until the estimated candidate region satisfies the predetermined criterion.

4. The method of claim 1, further comprising
receiving a current sensing location detected by the terminal using a position sensor, and
wherein the searching of the map database for the reference place comprises searching for the reference place within a region set with respect to the current sensing location.

5. The method of claim 4, further comprising, when the current sensing location is included in a predetermined inaccurate region, transmitting, to the terminal, a request for the user to input the surrounding environment information.

6. The method of claim 1, wherein, when the user verbally inputs the surrounding environment information, the server receives the surrounding environment information in the form of speech data and converts the surrounding environment information which is in the form of speech data into text.

7. The method of claim 1, further comprising
receiving, from the terminal, administrative district information to be used to limit a range of searching for the reference place, and
wherein the searching of the map database for the reference place comprises searching for the reference place within an administrative district corresponding to the administrative district information.

8. The method of claim 1, wherein the map database stores an indoor map and point-of-interest (POI) information on a map.

9. The method of claim 1, further comprising transmitting, to the terminal, confirmation request information about the determined current location to allow the user to confirm the determined current location.

10. A method of providing route guidance information to a terminal, performed by a server having wireless communication with the terminal, the method comprising:

receiving from the terminal a route guidance request including a current sensing location and a destination;

transmitting to the terminal an input request for a user to input surrounding environment information when the route guidance request satisfies a predetermined confirmation condition;

receiving, from the terminal, surrounding environment information including a reference place and a positional relationship between the reference place and a user, the surrounding environment information being input in the terminal in a natural language of the user by the user in response to the input request;

performing natural language processing on the surrounding environment information to extract place information about the reference place and positional relationship information about the positional relationship between the reference place and the user;

searching a map database for the reference place, corresponding to the place information, in a region set with respect to the current sensing location;

transmitting to the terminal a first additional request for the user to input first additional surrounding environment information;

receiving, from the terminal, first additional surrounding environment information input in natural language by the user in response to the first additional request;

performing natural language processing on the first additional surrounding environment information to extract first additional place information about a first additional reference place input by the user and first additional positional relationship information about the first additional reference place; and searching the map database for the reference place corresponding to the place information and the first additional place information, wherein the transmitting of the first additional request, the receiving of the first additional surrounding environment information, the extracting of the first additional place information and the first additional positional relationship information, and the searching for the reference place are repeatedly performed, until only one reference place corresponding to the place information and the first additional place information is found;

estimating a candidate region in which the user is likely to be located, based on the one reference place and the positional relationship information;

determining the candidate region as the user's current location; and generating route guidance information regarding a route from the determined current location to the destination and transmitting the route guidance information to the terminal.

11. The method of claim 10, wherein the predetermined confirmation condition comprises a case in which the current sensing location is included in an inaccurate region.

12. The method of claim 11, further comprising, when the current sensing location received from the terminal sharply changes to greater than a predetermined reference value, setting the inaccurate region such that the current sensing location is included in the inaccurate region.

13. The method of claim 10, wherein
the server determines an error range according to the current sensing location, sets a plurality of virtual points of departure in a zone set based on the error range with respect to the current sensing location, and generates a first route guidance path from the current sensing location to the destination and second route guidance paths from the plurality of points of departure to the destination, and the predetermined confirmation condition comprises a case in which a difference between a distance of the first route guidance path and any one of distances of the second route guidance paths exceeds a reference value determined based on the error range.

14. The method of claim 10, further comprising,
after determining that the estimated candidate region has exceeded a predetermined criterion, transmitting to the terminal a second additional request for the user to input second additional surrounding environment information;

receiving, from the terminal, second additional surrounding environment information input in natural language by the user, in response to the second additional request;

performing natural language processing on the second additional surrounding environment information to extract second additional place information about a second additional reference place input by the user and second additional positional relationship information about the second additional reference place; and searching the map database for the reference place corresponding to the place information and the second additional place information, wherein the transmitting of the second additional request, the receiving of the second additional surrounding environment information, the extracting of the second additional place information and the second additional positional relationship information, and the searching of the map database for the reference place are repeatedly performed, until one reference place corresponding to the place information and the second additional place information is found and the estimated candidate region satisfies the predetermined criterion.

15. The method of claim 10, wherein, when the user verbally inputs the surrounding environment information, the server receives the surrounding environment information in the form of speech data and converts the surrounding environment information which is in the form of speech data into text.

16. The method of claim 10, further comprising transmitting, to the terminal, confirmation request information about the determined current location to allow the user to confirm the determined current location, wherein when receiving confirmation about the confirmation request information from the terminal, the server transmits the route guidance information.

17. A non-transitory computer readable recording medium storing a program that, when executed by a computer, performs the method of claim 1.

* * * * *